(12) United States Patent
Seo et al.

(10) Patent No.: US 8,630,276 B2
(45) Date of Patent: Jan. 14, 2014

(54) METHOD OF TRANSMITTING CONTROL INFORMATION FOR PERFORMING HARQ PROCESS IN WIRELESS COMMUNICATION SYSTEM SUPPORTING PLURALITY OF TRANSMISSION BANDS

(75) Inventors: Dong Youn Seo, Anyang-si (KR); Suck Chel Yang, Anyang-si (KR); Jung Hoon Lee, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 13/133,330

(22) PCT Filed: Dec. 23, 2009

(86) PCT No.: PCT/KR2009/007707
§ 371 (c)(1),
(2), (4) Date: Jun. 7, 2011

(87) PCT Pub. No.: WO2010/074498
PCT Pub. Date: Jul. 1, 2010

(65) Prior Publication Data
US 2011/0249601 A1 Oct. 13, 2011

Related U.S. Application Data

(60) Provisional application No. 61/140,077, filed on Dec. 23, 2008, provisional application No. 61/148,367, filed on Jan. 29, 2009.

(30) Foreign Application Priority Data

Dec. 15, 2009 (KR) .......................... 10-2009-0124806

(51) Int. Cl.
*H04W 4/00* (2009.01)
*H04B 7/00* (2006.01)
*H04J 1/16* (2006.01)
*G08C 25/02* (2006.01)

(52) U.S. Cl.
USPC ........... 370/338; 370/235; 370/310; 370/329; 714/748

(58) Field of Classification Search
None
See application file for complete search history.

(56) References Cited

U.S. PATENT DOCUMENTS

| | | | |
|---|---|---|---|
| 2004/0137947 A1* | 7/2004 | Nimmo-Smith | 455/561 |
| 2009/0109873 A1* | 4/2009 | Shen et al. | 370/254 |
| 2010/0211840 A1 | 8/2010 | Kim et al. | |
| 2010/0220683 A1* | 9/2010 | Novak et al. | 370/330 |
| 2010/0278121 A1 | 11/2010 | Chun et al. | |
| 2010/0290419 A1* | 11/2010 | Wengerter | 370/329 |
| 2010/0309870 A1* | 12/2010 | Wengerter et al. | 370/329 |
| 2011/0069667 A1* | 3/2011 | Grovlen et al. | 370/329 |

FOREIGN PATENT DOCUMENTS

| | | | |
|---|---|---|---|
| KR | 10-2008-0030904 A | 4/2008 | |
| KR | 10-2008-0030905 A | 4/2008 | |
| KR | 10-2008-0065475 A | 7/2008 | |

\* cited by examiner

*Primary Examiner* — Yemane Mesfin
*Assistant Examiner* — Peter Chen
(74) *Attorney, Agent, or Firm* — Birch, Stewart, Kolasch & Birch, LLP

(57) ABSTRACT

A method of transmitting control information for performing a Hybrid Automatic Repeat Request (HARQ) process in a wireless communication system supporting a plurality of transmission bands is disclosed. The method includes generating the control information including HARQ Process Set (HPS) information indicating a specific HPS of a plurality of HPSs corresponding to the plurality of transmission bands, and transmitting the generated control information to a user equipment. A predetermined number of independent HARQ processes is performed according to the plurality of transmission bands.

14 Claims, 13 Drawing Sheets

Option1: explicit HPS

Fig. 9
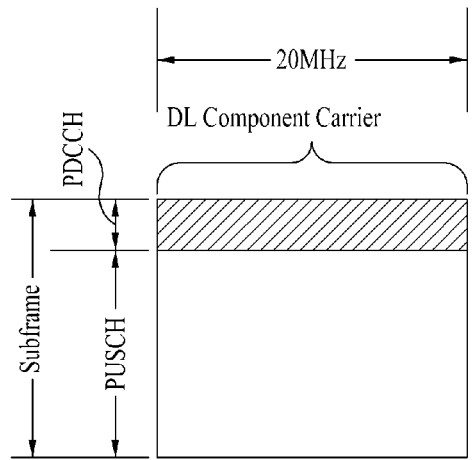
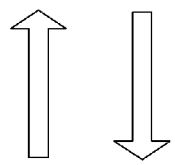
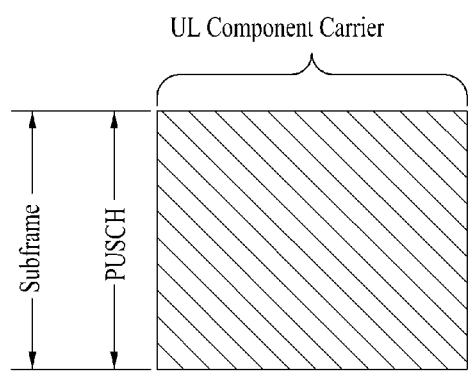

[Fig. 10

Option2-4: implicit HPS

METHOD OF TRANSMITTING CONTROL INFORMATION FOR PERFORMING HARQ PROCESS IN WIRELESS COMMUNICATION SYSTEM SUPPORTING PLURALITY OF TRANSMISSION BANDS

This application is the National Phase of PCT/KR2009/007707 filed on Dec. 23, 2009, which claims the benefit under 35 U.S.C. 119(e) of U.S. Provisional Application Nos. 61/140,077 and 61/148,367 filed on Dec. 23, 2008 and Jan. 29, 2009, respectively, and claims priority under 35 U.S.C. 119 (a) to Patent Application No. 10-2009-0124806 filed in Republic of Korea on Dec. 15, 2009, all of which are hereby expressly incorporated by reference into the present application.

TECHNICAL FIELD

The present invention relates to a method of transmitting control information for performing a Hybrid Automatic Repeat Request (HARQ) process in a wireless communication system supporting a plurality of transmission bands.

BACKGROUND ART (1) Physical Channels of Long Term Evolution (LTE) System and Signal Transmission Method Using the Same FIG. 1 is a diagram illustrating physical channels used in a 3$^{rd}$ Generation Project Partnership (3GPP) LTE system (Evolved Universal Terrestrial Radio Access (E-UTRA), Release 8) which is an example of a mobile communication system, and a general signal transmission method using the same.

A User Equipment (UE), which newly enters a cell upon being turned on, performs an initial cell search operation such as synchronization with a base station in step S101. At this time, the UE may receive a Primary Synchronization Channel (P-SCH) and a Secondary Synchronization Channel (S-SCH) from the base station, synchronize with the base station, and acquire information such as a cell ID. Thereafter, the UE may receive a Physical Broadcast Channel (PBCH) from the base station and acquire broadcasting information in the cell. Meanwhile, the UE may receive a downlink Reference Signal (RS) and check a downlink channel state in the initial cell search step.

The UE which completes the initial cell search operation may receive a Physical Downlink Control Channel (PDCCH) and a Physical Downlink Shared Channel (PDSCH) according to the PDCCH information and acquire detailed system information in step S102.

Meanwhile, the UE which does not complete the access to the base station may perform a random Access Procedure in steps 103 to S106, in order to complete the access to the base station. At this time, the UE may transmit a feature sequence through a Physical Random Access Channel (PRACH) as a preamble (S103) and receive a response message to the random access through the PDCCH and the PDSCH corresponding thereto (S104). In contention-based random access excluding handover, thereafter, a contention resolution procedure including transmission (S105) of an additional PRACH and reception (S106) of the PDCCH and the PDSCH corresponding thereto may be performed.

The UE which performs the above-described procedure may perform reception (S107) of the PDCCH/PDSCH and transmission (S108) of a Physical Uplink Shared Channel (PUSCH)/Physical Uplink Control Channel (PUCCH) as a general uplink/downlink signal transmission procedure.

(2) Slot Structure of LTE System

In a cellular Orthogonal Frequency Division Multiplexing (OFDM) wireless packet communication system, uplink/downlink data packet transmission is performed in subframe units. One subframe is defined as a predetermined time duration including a plurality of OFDM symbols.

3GPP supports a type 1 radio frame structure applicable to Frequency Division Duplex (FDD) and a type 2 radio frame structure applicable to Time Division Duplex (TDD).

FIG. 2 is a diagram showing the type 1 radio frame structure. The type 1 radio frame includes 10 subframes and one subframe includes two slots.

FIG. 3 is a diagram showing the type 2 radio frame structure. The type 2 radio frame includes two half frames and each half frame includes five subframes, a Downlink Pilot Time Slot (DwPTS), a Guard Period (GP) and an Uplink Pilot Time Slot (UpPTS). Among them, one subframe includes two slots. The DwPTS is used for initial cell search, synchronization or channel estimation of a terminal. The UpPTS is used for channel estimation of a base station and uplink transmission synchronization of a terminal. The GP is used to eliminate interference generated in uplink due to multi-path delay of a downlink signal between uplink and downlink. That is, one subframe includes two slots regardless of the type of the radio frame.

FIG. 4 is a diagram showing an LTE downlink slot structure. As shown in FIG. 4, a signal transmitted by each slot may be expressed by a resource grid including $N_{RB}^{DL} N_{SC}^{RB}$ subcarriers and $N_{symb}^{DL}$ OFDM symbols. Here, $N_{RB}^{DL}$ denotes the number of Resource blocks (RBs) in downlink, $N_{SC}^{RB}$ denotes the number of subcarriers configuring one RB, and $N_{symb}^{DL}$ denotes the number of OFDM symbols in one downlink slot.

FIG. 5 is a diagram showing an LTE uplink slot structure. As shown in FIG. 5, a signal transmitted by each slot may be expressed by a resource grid including $N_{RB}^{UL} N_{SC}^{RB}$ subcarriers and $N_{symb}^{UL}$ OFDM symbols. Here, $N_{RB}^{UL}$ denotes the number of RBs in uplink, $N_{SC}^{RB}$ denotes the number of subcarriers configuring one RB, and $N_{symb}^{UL}$ denotes the number of OFDM symbols in one uplink slot.

A resource element is a resource unit defined as an index (a, b) within the uplink slot and the downlink slot and indicates one subcarrier and one OFDM symbol. Here, a denotes an index on a frequency axis and b denotes an index on a time axis.

(3) Hybrid Automatic Repeat Request (HARM)

In a mobile communication system, one base station transmits or receives data to or from a plurality of terminals in one cell or sector in a radio channel environment. In a system operated in a multi-carrier form or a form similar thereto, the base station receives packet traffic from a wired Internet network and transmits the received packet traffic to the terminals using a predetermined communication scheme. At this time, determination as to when the base station transmits data to which of the terminals using which frequency band is called downlink scheduling. In addition, the base station demodulates data received from a terminal using a predetermined communication scheme and transmits packet traffic to the wired Internet network.

Determination as to when the base station allows which of the terminals to transmit uplink data using which frequency band is called uplink scheduling. In general, a terminal having a good channel state transmits or receives data using considerable time and frequency resources.

FIG. 6 is a diagram showing time and frequency RBs in time and frequency domains. The resource of the system operated in the multi-carrier form or the form similar thereto may be largely classified into a time domain and a frequency domain. The resource may be defined by an RB, which is composed of any N subcarriers and any M subframes or a predetermined time unit. At this time, N and M may be 1.

One rectangle of FIG. 6 denotes one RB, and one RB is formed by N subcarriers on one axis and the predetermined time unit on the other axis. In downlink, the base station schedules one or more RBs to a selected terminal according to a predetermined scheduling rule and the base station transmits data using the RBs allocated to the terminal. In uplink, the base station allocates one or more RBs to a selected terminal according to a predetermined scheduling rule and the terminal transmits data in uplink using the allocated resource.

A scheme for controlling an error when a frame is lost or damaged after scheduling is performed and data is transmitted includes an Automatic Repeat Request (ARQ) scheme and a Hybrid ARQ (HARQ) scheme. Basically, in the ARQ scheme, a transmitter waits for an Acknowledgement (ACK) signal after transmitting one frame and a receiver transmits the ACK signal only when the frame is normally received without error. If an error occurs in the frame, the receiver transmits a Negative-ACK (NAK) and the frame in which the error occurs is deleted from a buffer of the receiver. The transmitter transmits a subsequent frame when receiving the ACK signal and retransmits the frame when receiving the NAK signal. Unlike the ARQ scheme, in the HARQ scheme, if the received frame cannot be demodulated, the receiver transmits the NAK signal to the transmitter, but the received frame is stored in the buffer during a predetermined period of time. Then, when the frame is retransmitted, the retransmitted frame is combined with the previously received frame so as to increase a successful reception ratio.

Recently, the HARQ scheme which is more efficient than the basic ARQ scheme is widely used. The HARQ scheme includes various schemes and may be broadly classified into a synchronous HARQ scheme and an asynchronous HARQ. In addition, the HARQ scheme may be classified into a channel-adaptive HARQ scheme and a channel-non-adaptive HARQ scheme, depending on whether the amount of resources used for retransmission is adjusted according to channel states.

In the synchronous HARQ scheme, when initial transmission fails, retransmission is performed at a timing determined by a system. That is, if it is assumed that the retransmission is performed in every fourth time unit after the initial transmission fails, since the timing when the retransmission is performed is previously determined between the base station and the terminal, the timing when the retransmission is performed does not need to be reported. When a data transmission side receives a NAK message, the frame is retransmitted in every fourth time unit until an ACK message is received.

In contrast, in the asynchronous HARQ scheme, retransmission timing is determined by new scheduling or additional signaling. The retransmission timing of the frame which has previously failed to be transmitted may be changed by various factors such as a channel state.

In the channel-non-adaptive HARQ scheme, modulation of the frame, the number of used RBs, and Adaptive Modulation and Coding (AMC), all of which are determined at the time of initial transmission, are used at the time of retransmission without change. In contrast, in the channel-adaptive HARQ scheme, the modulation of the frame, the number of used RBs, and the AMC are changed according to the channel state. For example, in the channel-non-adaptive HARQ scheme, a transmitter transmits data using six RBs in initial transmission and retransmits data using six RBs in retransmission. In contrast, in the channel-adaptive HARQ scheme, even when data is transmitted using six RBs in initial transmission, the data may be retransmitted using RBs less or greater in number than 6 according to the channel state. Based on such classification, a combination of the four HARQ schemes may be considered, but the mainly used HARQ schemes include an asynchronous channel-adaptive HARQ scheme and a synchronous channel-non-adaptive HAQR scheme.

In the asynchronous channel-adaptive HARQ scheme, the retransmission timing and the amount of resources are adaptively changed according to the channel state so as to maximize retransmission efficiency. However, since overhead is increased, this scheme is not considered in uplink.

Meanwhile, in the synchronous channel-non-adaptive HAQR scheme, since the retransmission timing and the resource allocation are determined by the system, almost no overhead occurs, but retransmission efficiency is low if this scheme is used in an environment in which the channel state is considerably changed.

In the current 3GPP LTE, the asynchronous HARQ scheme is used in downlink and the synchronous HARQ scheme is used in uplink.

FIG. 7 is a diagram illustrating resource allocation and retransmission of the asynchronous HARQ scheme. For example, in downlink, time delay occurs as shown in FIG. 7 while scheduling is performed, data is transmitted, ACK/NAK information is received from a terminal, and next data is transmitted. This time delay occurs due to channel propagation delay and time consumed for data decoding and data encoding. A transmission method using independent HARQ processes is used for gapless data transmission during a delay period. For example, if a shortest period from current data transmission to next data transmission is 7 subframes, data can be transmitted by performing 7 independent processes without gap. In the LTE, a maximum of 8 processes may be allocated if a Multiple Input Multiple Output (MIMO) scheme is not used.

(4) Multi-Carrier

The concept of multi-carrier and the concept of Component Carrier (CC) will be described. FIG. 8 is a diagram illustrating a frequency band used in a system supporting multi-carrier. In FIG. 8, multi-carrier denotes the entire frequency band used by the base station and is equal to the whole band. For example, the multi-carrier may be 100 MHz.

The CC refers to an element carrier configuring the multi-carrier. That is, a plurality of CCs configures a multi-CC through carrier aggregation. The CC includes a plurality of lower bands. At this time, if the term 'multi-carrier' is replaced with the term 'whole band'. CC aggregation is also called bandwidth aggregation. As a subband, the lower band may be replaced with a partial band. In addition, the carrier aggregation can extend a bandwidth by collecting a plurality of carriers in order to increase a data rate. For example, in the existing system, one carrier is 20 MHz. However, the bandwidth can be extended to 100 MHz by collecting five carriers each having 20 MHz. The carrier aggregation includes aggregation of carriers located in different frequency bands.

At this time, if the multi-carrier is applied to the system, research into how the above-described HARQ processes are configured is necessary.

DISCLOSURE OF INVENTION

Technical Problem

An object of the present invention devised to solve the problem lies on a method of configuring HARQ processes in a wireless communication system supporting multi-carrier.

Solution to Problem

The object of the present invention can be achieved by providing a method of transmitting control information for performing a Hybrid Automatic Repeat Request process in a wireless communication system supporting a plurality of transmission bands, the method including generating the control information including HARQ Process Set (HPS) information indicating a specific HPS of a plurality of HPSs corresponding to the plurality of transmission bands, and transmitting the generated control information to a user equipment. A predetermined number of independent HARQ processes is performed according to the plurality of transmission bands.

Preferably, the HPS information may be included in a bit field for the HPS information in the control information.

Preferably, when the number of the plurality of transmission bands is s, the bit field may be composed of $\lceil \log_2 s \rceil$ bits and ' $\lceil \; \rceil$ ' is a ceiling function.

Preferably, the control information may include an adjustment flag, and a predetermined bit field may be used as a bit field for transmitting the HPS information, according to a value of the adjustment flag.

Preferably, the predetermined bit field may correspond to one of a bit field indicating a Redundancy Version (RV), a bit field indicating a Modulation and Coding Scheme (MCS), and a bit field indicating both the RV and the MCS.

Preferably, the control information may include a bit field indicating a Modulation and Coding Scheme (MCS) and a Redundancy Version (RV) and a bit field for a Resource Indication Value (RIV), and, if a value included in the bit field for the RIV is an unused value, the bit field indicating the MCS and the RV may be used as a bit field for transmitting the HPS information.

Preferably, the specific HPS may include a predetermined number of independent HARQ processes in a predetermined period, and the control information further may include HARQ Process Number (HPN) information indicating a specific HARQ process of the predetermined number of independent HARQ processes.

Preferably, the plurality of transmission bands may include five contiguous or discontiguous transmission bands.

In another aspect of the present invention, provided herein is, a user equipment in a wireless communication system supporting a plurality of transmission bands, the user equipment including a Radio Frequency (RF) unit configured to receive control information including HARQ Process Set (HPS) information indicating a specific HPS of a plurality of HPSs corresponding to the plurality of transmission bands, and a processing unit configured to control HARQ process using the HPS information included in the received control signal, the processing unit being connected electrically to the RF unit.

Preferably, the HPS information may be included in a bit field for the HPS information in the control information.

Preferably, when the number of the plurality of transmission bands is s, the bit field may be composed of $\lceil \log_2 s \rceil$ bits and ' $\lceil \; \rceil$ ' is a ceiling function.

Preferably, the control information may include an adjustment flag, and the processing unit may recognize a predetermined bit field as a bit filed for transmitting the HPS information, according to a value of the adjustment flag.

Preferably, the predetermined bit field may correspond to one of a bit field indicating a Redundancy Version (RV), a bit field indicating a Modulation and Coding Scheme (MCS), and a bit field indicating both the RV and the MCS.

Preferably, the control information may include a bit field indicating a Modulation and Coding Scheme (MCS) and a Redundancy Version (RV) and a bit field for a Resource Indication Value (RIV), and, if a value included in the bit field for the RIV is an unused value, the processing unit recognizes the bit field indicating the MCS and the RV as a bit field for transmitting the HPS information.

Preferably, the specific HPS may include a predetermined number of independent HARQ processes in a predetermined period, and the control information further may include a HARQ Process Number (HPN) information indicating a specific HARQ process of the predetermined number of independent HARQ processes.

Preferably, the plurality of transmission bands includes five contiguous or discontiguous transmission bands.

Advantageous Effects of Invention

According to the present invention, in a system supporting multi-carrier, HARQ processes can be efficiently performed.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 9 is a diagram illustrating downlink and uplink frequency bands during communication between a base station and a User Equipment (UE) in a system supporting only one transmission band.

BEST MODE FOR CARRYING OUT THE INVENTION

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For example, in the following description, predetermined terms are used, but other terms having the same meaning may be used. Also, wherever possible, the same reference numbers will be used throughout the drawings and the specification to refer to the same or like parts.

FIG. 9 is a diagram illustrating downlink and uplink frequency bands during communication between a base station and a User Equipment (UE) in a system supporting only one transmission band. As shown in FIG. 9, transmission or reception is performed between the base station and the UE through one frequency band in the existing system. If an adjacent frequency band is present and transmission or reception is performed using the adjacent frequency band, handover of the frequency band is performed by an inter-frequency handover procedure such that transmission or reception is performed.

Figure 1:
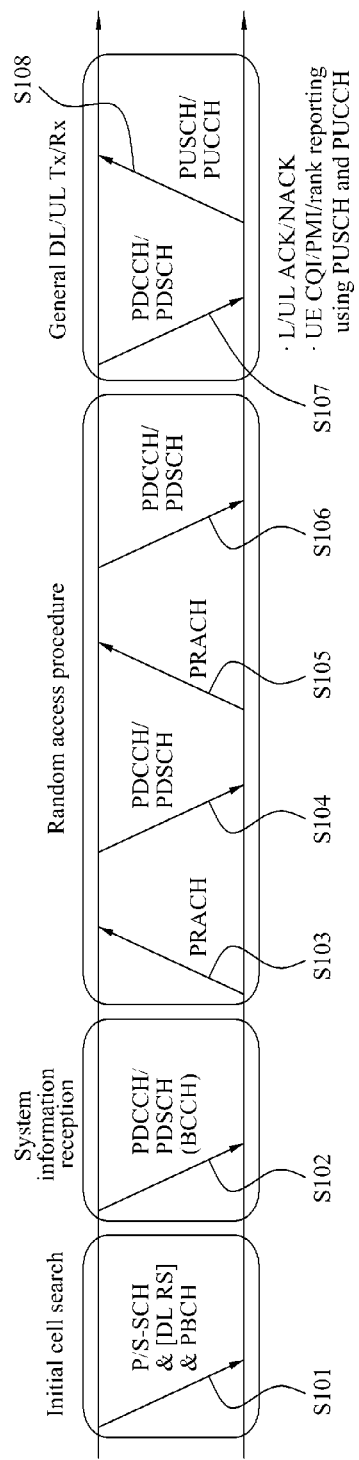
FIG. 1 is a diagram illustrating physical channels used in a $3^{rd}$ Generation Project Partnership (3GPP) LTE system (Evolved Universal Terrestrial Radio Access (E-UTRA), Release 8) which is an example of a mobile communication system and a general signal transmission method using the same.
Figure 2:
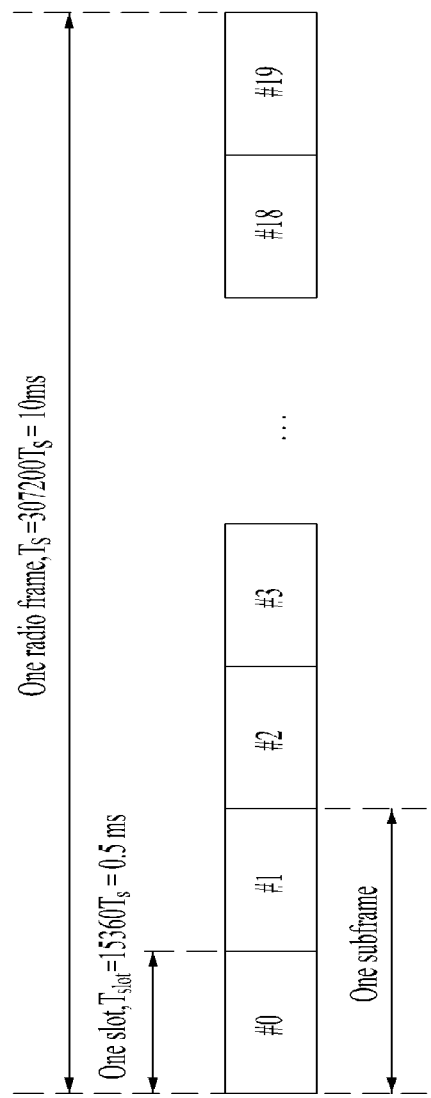
FIG. 2 is a diagram showing a type 1 radio frame structure.
Figure 3:
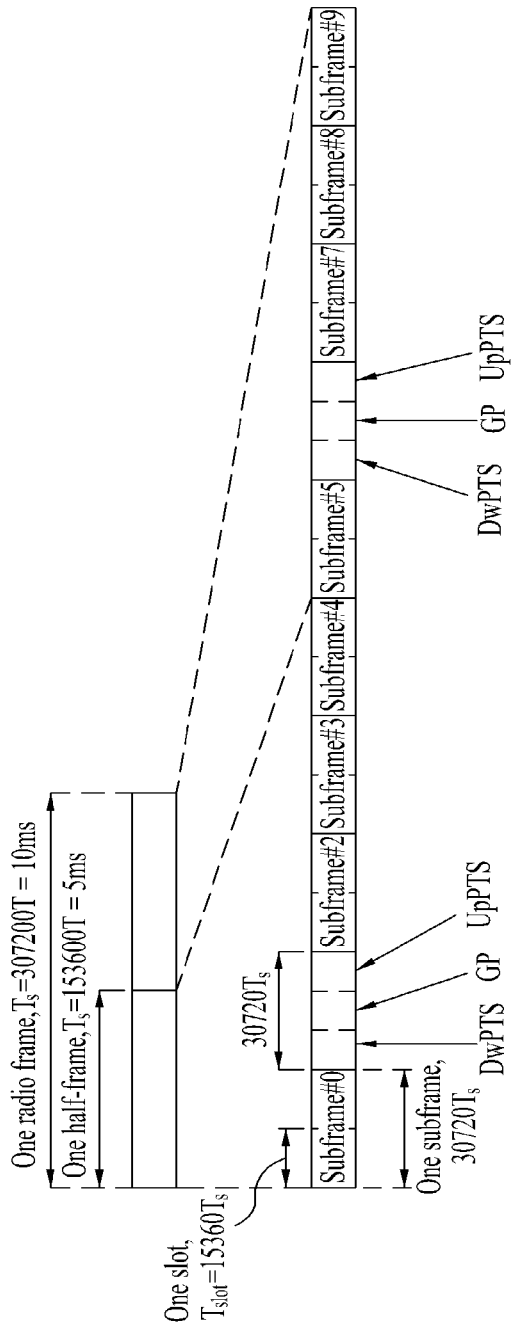
FIG. 3 is a diagram showing a type 2 radio frame structure.
Figure 4:
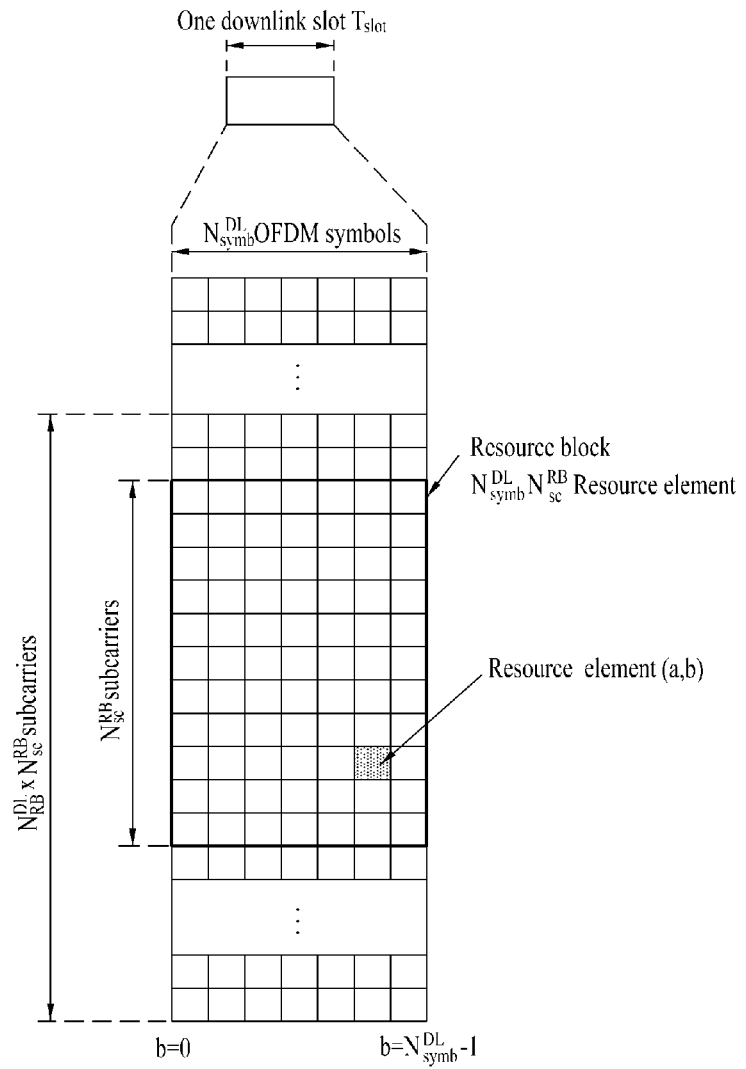
FIG. 4 is a diagram showing an LTE downlink slot structure.
Figure 5:
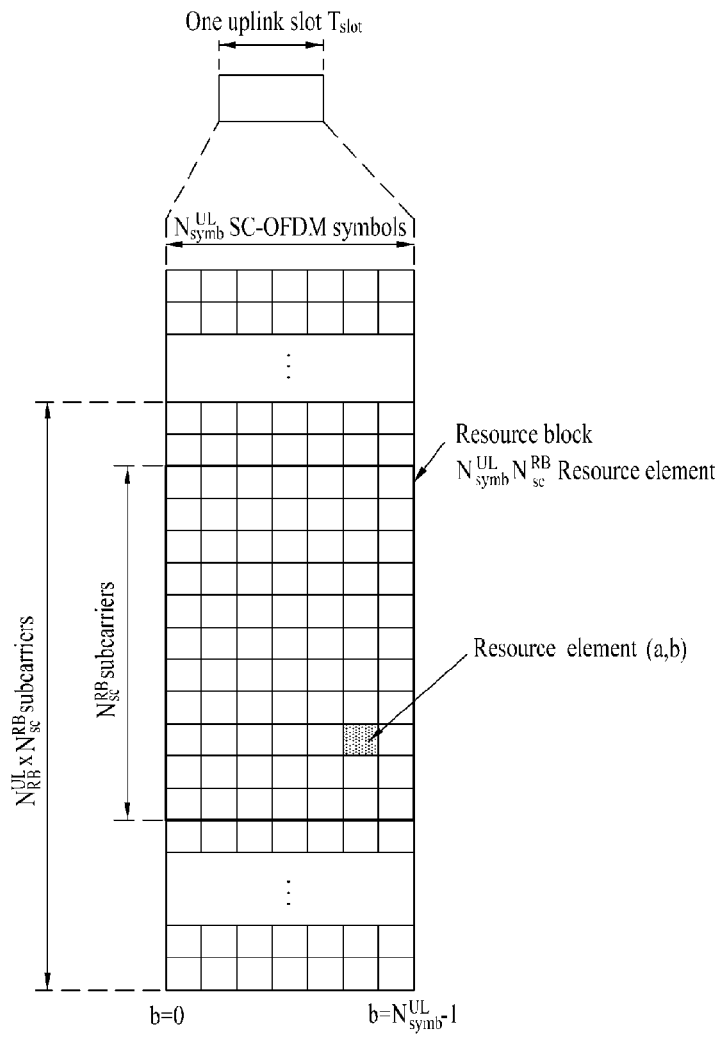
FIG. 5 is a diagram showing an LTE uplink slot structure.
Figure 6:
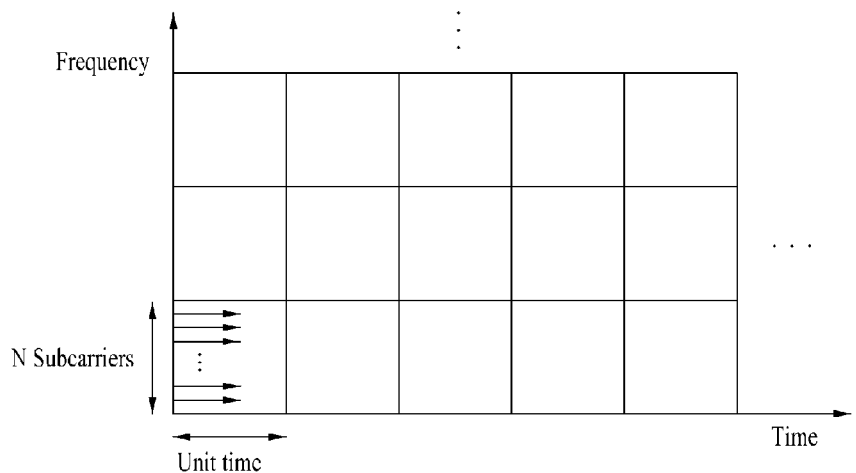
FIG. 6 is a diagram showing time and frequency RBs in time and frequency domains.
Figure 7:
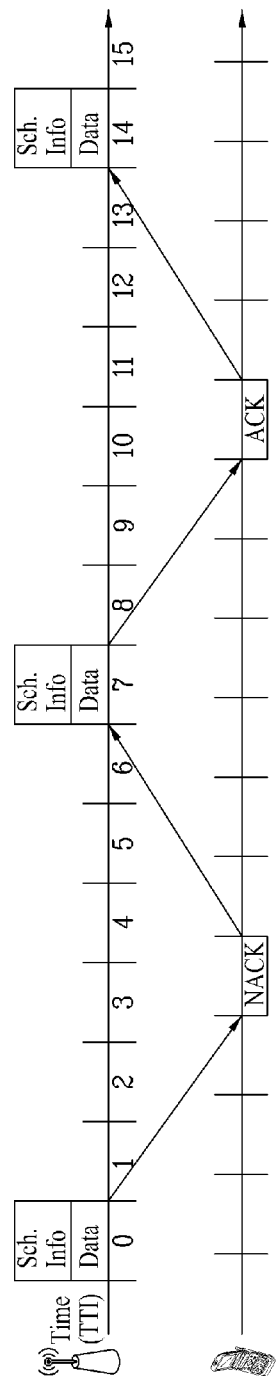
FIG. 7 is a diagram illustrating resource allocation and retransmission of an asynchronous HARQ scheme.
Figure 8:
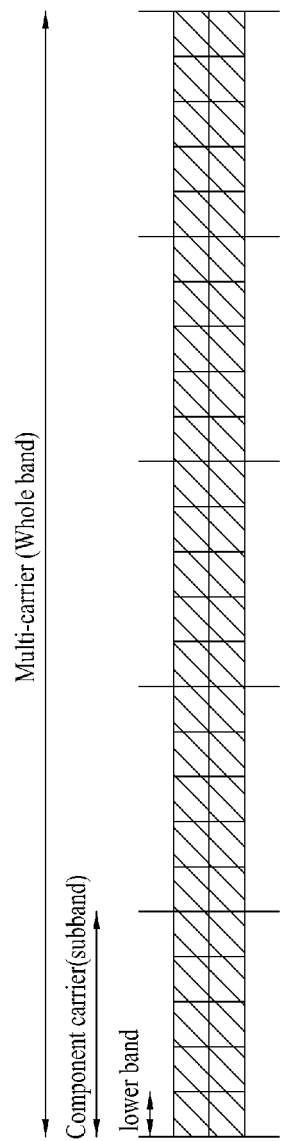
FIG. 8 is a diagram illustrating a frequency band used in a system supporting multi-carrier.
Figure 10:
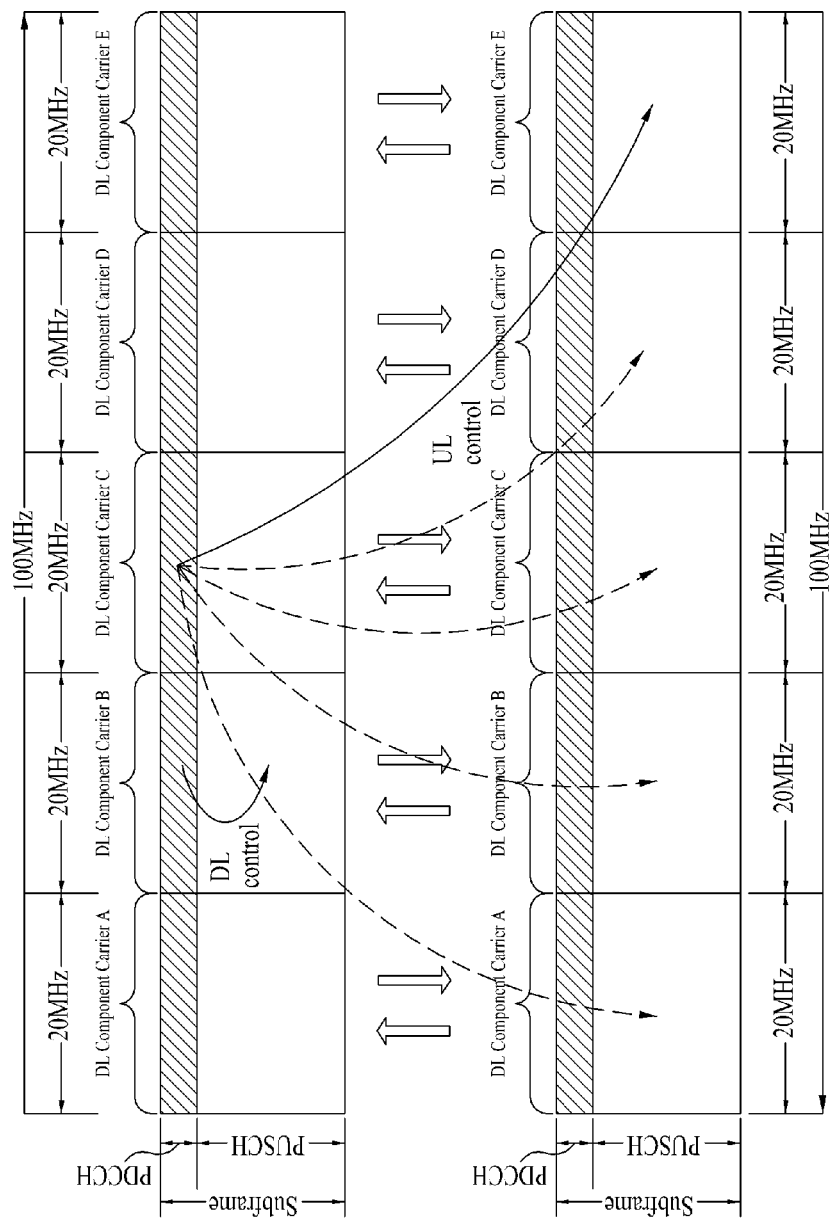
FIG. 10 is a diagram illustrating downlink and uplink frequency bands during communication between a base station and a UE in a system supporting a plurality of transmission bands.

FIG. 10 is a diagram illustrating downlink and uplink frequency bands during communication between a base station and a UE in a system supporting a plurality of transmission bands. As shown in FIG. 10, the system of the present invention supports a plurality of Component Carriers (CCs). That is, in the system of the present invention, one UE may simultaneously transmit or receive a plurality of CCs or selectively transmit or receive some of the plurality of CCs. If independent HARQ processes are configured between the CCs, the following transmission methods may be used in consideration of burden of a control signal and retransmission efficiency.

Hereinafter, a method of configuring HARQ processes in a system supporting a plurality of CCs according to an embodiment of the present invention will be described.

First Embodiment

As a first embodiment, a method of matching HARQ Process Sets (HPSs) to CCs and transmitting only the sets fixed to the CCs is suggested. The HPS refers to a group of a predetermined number of independent HARQ processes. For example, in the first Embodiment, the 8 independent processes may be defined as one HPS.

Figure 11:
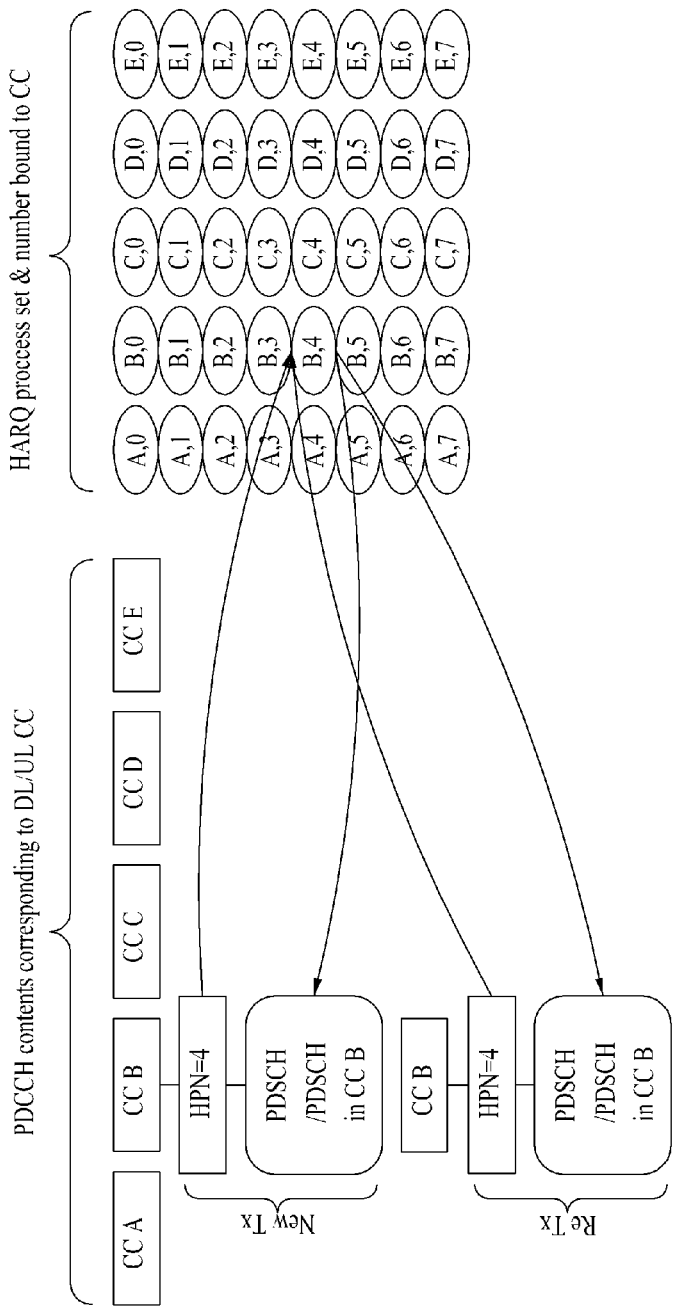
FIG. 11 is a diagram illustrating matching of independent HARQ Process Sets (HPSs) to Component Carriers (CCs) according to an embodiment of the present invention.

FIG. 11 is a diagram illustrating matching of independent HPSs to CCs according to an embodiment of the present invention. As shown in FIG. 11, independent HPSs (specifically, five HPSs: A, B, C, D and E) are respectively configured with respect to five CCs and, if a HARQ Process Number (HPN) is indicated through a downlink or uplink control signal for controlling a specific CC, only the process number corresponding to the HPN within the HPS matched in initial transmission and retransmission transmission is used. The HPN indicates what number the process is in the matched HPS. N may correspond to the number of buffers for performing the independent HARQ processes.

Preferably, a downlink control signal for scheduling a PDSCH may be configured to freely control the PDSCH of a certain downlink CC regardless of the downlink CC through which a PDCCH including the downlink control signal is transmitted. In addition, an uplink control signal may be configured to freely control a PUSCH of a certain CC regardless of a downlink CC through which a PDCCH including a downlink control signal is transmitted. The downlink control signal for scheduling the PDSCH and the uplink control signal for scheduling the PUSCH may include downlink CC information and uplink CC information to which scheduling will be applied, respectively.

For example, as shown in FIG. 11, if an HPN of a control signal of a CC B is 4, a HARQ process (B, 4) may be indicated. In such a configuration, since only the HPN within the matched HPS is reported without reporting which of A, B, C, D and E is used by the CC, signaling burden can be reduced.

Meanwhile, determination as to whether or not additional signaling is necessary in uplink and downlink will be described. Since a synchronous HARQ scheme is used in uplink, the HPN is configured to be interlock with an uplink time point, additional signaling is not necessary. In addition, since an asynchronous HARQ scheme is used in downlink, the HPN is included in a downlink control signal. At this time, since the set is matched to the CC, additional set signaling is not necessary.

Hereinafter, a second embodiment of the present invention will be described.

Second Embodiment

As a second embodiment of the present invention, a method of constructing independent HPSs according to the number of CCs and freely mapping the HPSs to the CCs is provided.

Figure 12:
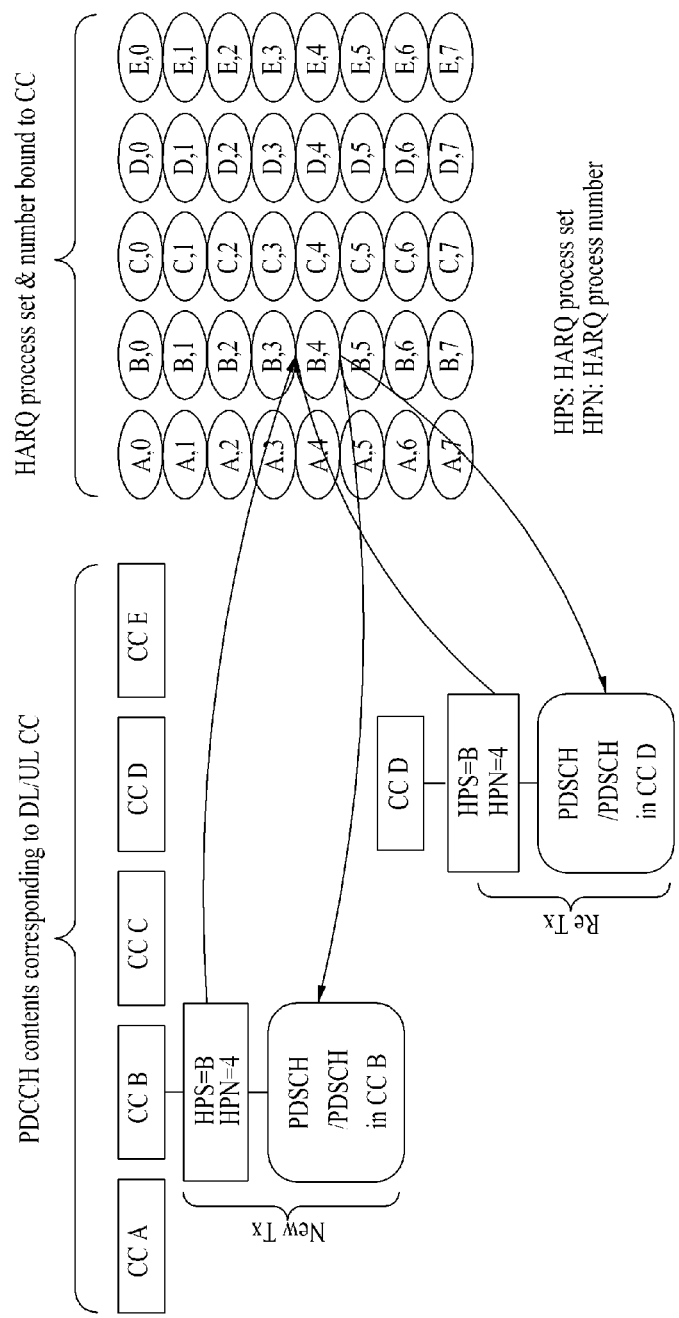
FIG. 12 is a diagram illustrating a method of configuring independent HPSs according to CCs and freely mapping the HPSs to the CCs according to an embodiment of the present invention.

FIG. 12 is a diagram illustrating a method of configuring independent HPSs according to CCs and freely mapping the HPSs to the CCs according to an embodiment of the present invention. As shown in FIG. 12, an HPS and an HPN are indicated by a downlink or uplink control signal for controlling a specific CC so as to use a process corresponding thereto. For example, if an HPS of a control signal of a CC B is C and an HPN is 2, a HARQ process (C, 2) is indicated. At this time, in initial transmission, it is meaningless for an HPS to be selectively used. However, in retransmission, the HPS is matched to a CC having a good channel and data is transmitted through the CC, thereby increasing data reception rate. Accordingly, matching between a specific CC and a specific HPS may be fixed and used in the initial transmission, and the HPS is indicated only in the retransmission.

Since the synchronous HARQ scheme is used in uplink, the HPN is interlock with an uplink time. Accordingly, a control signal for the HPN is not necessary, but a signal indicating the HPS is necessary. The following methods are suggested as a method of configuring the signal indicating the HPS. Hereinafter, it is assumed that the number of CCs is s.

(1) Method of Explicitly Indicating HPS

Figure 13:
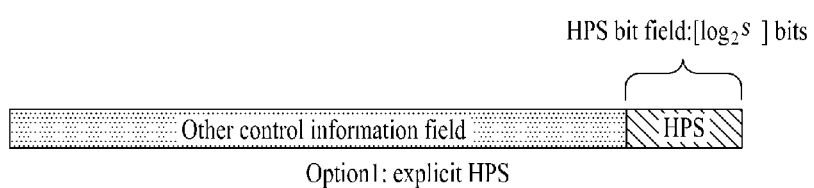
FIG. 13 is a diagram showing a field architecture of control information including a field indicating an HPS according to an embodiment of the present invention.

FIG. 13 is a diagram showing a field architecture of control information including a field indicating an HPS according to an embodiment of the present invention. As shown in FIG. 13, the HPS may be explicitly indicated using an explicit HPS bit field. At this time, $\lceil \log_2 s \rceil$ bits are necessary as the HPS bit field. At this time, ' $\lceil \ \rceil$ ' denotes a ceiling function.

(2) Method of Implicitly Indicating HPS

The following two methods are suggested as a method of implicitly indicating an HPS.

2-1) Method of using a Combination of CC Adjustment Flag and Existing Bit Field

Figure 14:
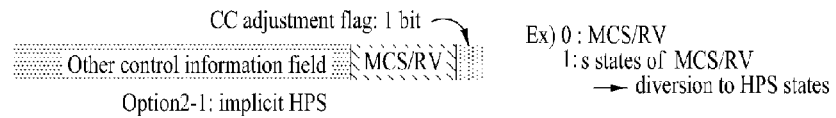
FIG. 14 is a diagram showing a field architecture of control information including a CC adjustment flag according to an embodiment of the present invention.

In the present method, s states of the existing Modulation and Coding Scheme/Redundancy version (MCS/RV) bit field and a CC adjustment flag are used. For example, the CC adjustment flag may be composed of 1 bit. If the CC adjustment flag is added to the bit field and the CC adjustment flag is triggered, some s states of the existing MCS/RV bit field are analyzed not as the MCS/RV value but as a value indicating the HPS. FIG. 14 is a diagram showing a field architecture of control information including a CC adjustment flag according to an embodiment of the present invention. As shown in FIG. 14, for example, in the case where a 1-bit CC adjustment flag is added, the MCS/RV value is analyzed as the existing MCS/RV value if the CC adjustment flag is 0 and the MCS/RV value is analyzed as the value indicating the HPS if the CC adjustment flag is 1. At this time, since the existing RV field is used for another purpose, the RV cannot be newly set. At this time, the RV may be used in order of 0, 2, 3 and 1, similar to the existing synchronous scheme.

2-2) Method of Using s States of Existing MCS/RV Bit Field and Unused Resource Indication Value (RIV)

Figure 15:
FIG. 15 is a diagram showing a field architecture of control information in which a Modulation and Coding Scheme/Redundancy version (MCS/RV) bit field is used as a bit field indicating an HPS using an unused Resource Indication Value (RIV), according to an embodiment of the present invention.

When an unused RIV value (RIV value which is not formed of a combination of a starting point of a valid RB and a length) is used, some s states of the existing MCS/RV bit field are analyzed not as the MCS/RV value but as the value indicating the HPS. FIG. 15 is a diagram showing a field architecture of control information in which an MCS/RV bit field is used as a bit field indicating an HPS using an unused RIV, according to an embodiment of the present invention. As shown in FIG. 15, the MCS/RV value indicates the existing MCS/RV value if the RIV is a valid RIV, and the MCS/RV value indicates the HPS if the RIV is the unused RIV value. Since resource allocation using the RIV is necessary in the initial transmission, the unused RIV is available only in the retransmission. At this time, resource allocation follows previous transmission.

Meanwhile, since the asynchronous HARQ scheme is used in downlink, the HPN is included in the downlink control signal and additional HPS signaling is necessary.

Hereinafter, the following methods are suggested as a method of configuring the additional HPS signaling. Hereinafter, it is assumed that the number of CCs is s.

(1) Method of Explicitly Indicating HPS

Figure 16:
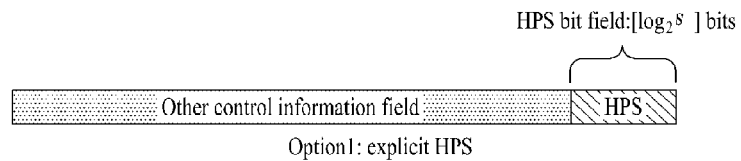
FIG. 16 is a diagram showing a field architecture of control information including a field indicating an HPS according to an embodiment of the present invention.

FIG. 16 is a diagram showing a field architecture of control information including a field indicating an HPS according to an embodiment of the present invention. As shown in FIG. 16, the HPS may be explicitly indicated using an explicit HPS bit field. At this time, $\lceil \log_2 s \rceil$ bits are necessary as the HPS bit field. At this time, ' $\lceil \ \rceil$ ' denotes a ceiling function.

(2) Method of Implicitly Indicating HPS

The following two methods 2-1) and 2-2) are suggested as a method of implicitly indicating an HPS.

2-1) Method of Using Combination of CC Adjustment Flag and Existing Bit Field

As the method of using a combination of the CC adjustment flag and the existing bit field, the following three methods A), B) and C) may be considered.

Figure 17:
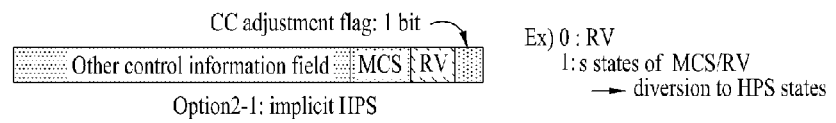
FIG. 17 is a diagram showing a field architecture of control information including a CC adjustment flag according to an embodiment of the present invention.

A) In the present method, s states of the existing RV bit field and the CC adjustment flag are used. For example, the CC adjustment flag may be composed of 1 bit. If the CC adjustment flag is added to the bit field and the CC adjustment flag is triggered, some s states of the existing MCS bit field are analyzed not as the RV value but as the value indicating the HPS. FIG. 17 is a diagram showing a field architecture of control information including a CC adjustment flag according to an embodiment of the present invention. As shown in FIG. 17, for example, in the case where a 1-bit CC adjustment flag is added, the RV value is analyzed as the existing RV value if the CC adjustment flag is 0 and the RV value is analyzed as the value indicating the HPS if the CC adjustment flag is 1. Since the RV has 2 bit and thus can express only four states, if the number of CCs is 5, the HPS can be indicated only in the retransmission and a previously matched set should be used in the initial transmission.

Figure 18:
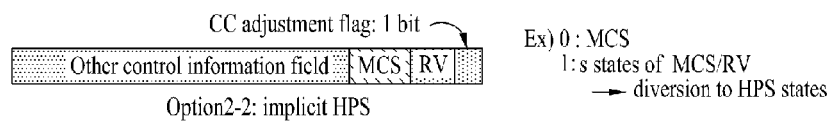
FIG. 18 is a diagram showing a field architecture of control information including a CC adjustment flag according to an embodiment of the present invention.

B) In the present method, the state of the existing MCS bit field and a 1-bit CC adjustment flag are used. For example, the CC adjustment flag may be composed of 1 bit. If the CC adjustment flag is added to the bit field and the CC adjustment flag is triggered, some s states of the existing MCS bit field are analyzed not as the MCS value but as the value indicating the HPS. FIG. 18 is a diagram showing a field architecture of control information including a CC adjustment flag according to an embodiment of the present invention. As shown in FIG. 18, for example, in the case where the 1-bit CC adjustment flag is added, the MCS value is analyzed as the existing MCS value if the CC adjustment flag is 0 and the MCS value is analyzed as the value indicating the HPS if the CC adjustment flag is 1.

Figure 19:
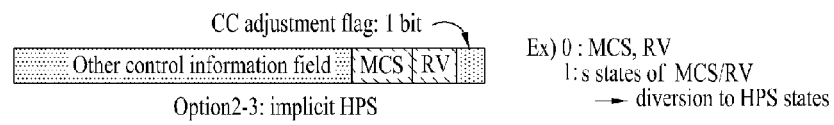
FIG. 19 is a diagram showing a field architecture of control information including a CC adjustment flag according to an embodiment of the present invention.

C) In the present method, s states of the existing MCS/RV bit field and a CC adjustment flag are used. For example, the CC adjustment flag may be composed of 1 bit. If the CC adjustment flag is added and the CC adjustment flag is triggered, some s states of the existing MCS/RV bit field are analyzed not as the MCS/RV value but as the value indicating the HPS. FIG. 19 is a diagram showing a field architecture of control information including a CC adjustment flag according to an embodiment of the present invention. As shown in FIG. 19, for example, in the case where a 1-bit CC adjustment flag is added, the MCS/RV value is analyzed as the existing MCS/RV value if the CC adjustment flag is 0 and the MCS/RV value is analyzed as the value indicating the HPS if the CC adjustment flag is 1.

Figure 20:
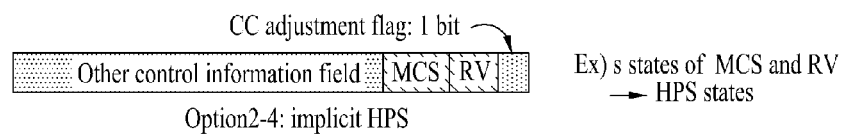
FIG. 20 is a diagram showing a field architecture of control information in which an RV bit field is used as a field indicating an HPS using a MCS value, according to an embodiment of the present invention.

2-2) In the present method, a combination of the existing RV bit field and a specific MCS is used. FIG. 20 is a diagram showing a field architecture of control information in which an RV bit field is used as a field indicating an HPS using a MCS value according to an embodiment of the present invention. In the present method, when a specific MCS is used, the MCS value is ignored and s states of the existing RV bit field are analyzed not as the RV value but as the value indicating the HPS. At this time, a specific combination is applied only to the retransmission.

Figure 21:
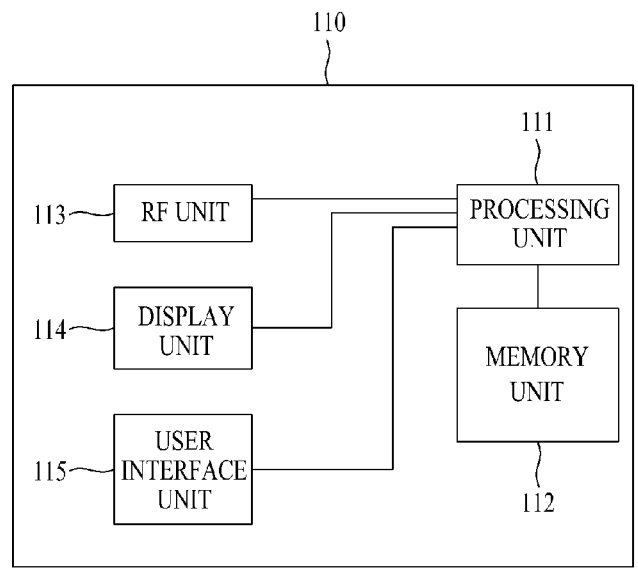
FIG. 21 is a block diagram showing the configuration of a device according to the present invention which is applicable to a UE or a base station.

Meanwhile, FIG. 21 is a block diagram showing the configuration of a device according to the present invention which is applicable to a UE or a base station. As shown in FIG. 21, the device 210 includes a processing unit 211, a memory unit 212, a Radio Frequency (RF) unit 213, a display unit 214 and a user interface unit 215. A physical interface protocol layer is performed by the processing unit 211. The processing unit 211 provides a control plane and a user plane. The functions of the layers may be performed by the processing unit 211. The memory unit 212 is electrically connected to the processing unit 211 and stores an operating system, an application and a general file. If the device 210 is a UE, the display unit 214 can display a variety of information and can be implemented by a Liquid Crystal Display (LCD), an Organic Light Emitting Diode (OLED) or the like. The user interface unit 215 may be combined with a known user interface such as a keypad or a touch screen. The RF unit 213 is electrically connected to the processing unit 211 and transmits or receives an RF signal.

In uplink, the UE including the configuration of the above-described device receives control information including an HPS and an HPN (which may be included only in downlink) from a base station and performs a HARQ process between the base station and the UE.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. In addition, it will be apparent that embodiments may be configured by combining claims which do not have an explicit relationship therebetween or new claims may be added by amendment after application.

The embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit is located inside or outside of the processor, so that it can communicate with the aforementioned processor via a variety of well-known means.

Mode for the Invention

Various embodiments have been described in the best mode for carrying out the invention It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be applied to a terminal, a base station or the other equipments of a wireless mobile communication system.

The invention claimed is:

1. A method of transmitting control information for performing a Hybrid Automatic Repeat Request (HARQ) process in a wireless communication system supporting a plurality of transmission bands, the method comprising:
generating the control information including HARQ Process Set (HPS) information and HARQ Process Number (HPN) information; and
transmitting the generated control information to a user equipment,
wherein the HPS information indicates a specific HPS of a plurality of HPSs corresponding to the plurality of transmission bands during a retransmission of the control information is performed,
wherein the specific HPS includes a predetermined number of independent HARQ processes in a predetermined period,
wherein the predetermined number of independent HARQ processes is performed according to the plurality of transmission bands, and
wherein the HPN information indicates a specific HARQ process of the predetermined number of independent HARQ processes.

2. The method according to claim 1, wherein the HPS information is included in a bit field for the HPS information in the control information.

3. The method according to claim 2, wherein, when the number of the plurality of transmission bands is s, the bit field is composed of $\lceil \log_2 s \rceil$ bits and '$\lceil$ $\rceil$' denotes a ceiling function.

4. The method according to claim 1, wherein the control information includes an adjustment flag, and a predetermined bit field is used as a bit field for transmitting the HPS information, according to a value of the adjustment flag.

5. The method according to claim 4, wherein the predetermined bit field corresponds to one of a bit field indicating a Redundancy Version (RV), a bit field indicating a Modulation and Coding Scheme (MCS), and a bit field indicating both the RV and the MCS.

6. The method according to claim 1, wherein the control information includes a bit field indicating a Modulation and Coding Scheme (MCS) and a Redundancy Version (RV) and a bit field for a Resource Indication Value (RIV), and, if a value included in the bit field for the RIV is an unused value, the bit field indicating the MCS and the RV is used as a bit field for transmitting the HPS information.

7. The method according to claim 1, wherein the plurality of transmission bands include five contiguous or discontiguous transmission bands.

8. A user equipment in a wireless communication system supporting a plurality of transmission bands, the user equipment comprising:
   a Radio Frequency (RF) unit configured to receive control information including Hybrid Automatic Repeat Request (HARQ) Process Set (HPS) information and HARQ Process Number (HPN) information; and
   a processing unit configured to control HARQ process using the HPS information included in the received control signal, the processing unit being connected electrically to the RF unit,
   wherein the HPS information indicates a specific HPS of a plurality of HPSs corresponding to the plurality of transmission bands during a retransmission of the control information is required,
   wherein the specific HPS includes a predetermined number of independent HARQ processes in a predetermined period,
   wherein the predetermined number of independent HARQ processes is performed according to the plurality of transmission bands, and
   wherein the HPN information indicates a specific HARQ process of the predetermined number of independent HARQ processes.

9. The user equipment according to claim 8, wherein the HPS information is included in a bit field for the HPS information in the control information.

10. The user equipment according to claim 9, wherein, when the number of the plurality of transmission bands is s, the bit field is composed of $\lceil \log_2 s \rceil$ bits and '$\lceil$ $\rceil$' denotes a ceiling function.

11. The user equipment according to claim 8, wherein the control information includes an adjustment flag, and the processing unit recognizes a predetermined bit field as a bit field for transmitting the HPS information, according to a value of the adjustment flag.

12. The user equipment according to claim 11, wherein the predetermined bit field corresponds to one of a bit field indicating a Redundancy Version (RV), a bit field indicating a Modulation, and a bit field indicating both the RV and the MCS.

13. The user equipment according to claim 8, wherein the control information includes a bit field indicating a Modulation and Coding Scheme (MCS) and a Redundancy Version (RV) and a bit field for a Resource Indication Value (RIV), and, if a value included in the bit field for the RIV is an unused value, the processing unit recognizes the bit field indicating the MCS and the RV as a bit field for transmitting the HPS information.

14. The user equipment according to claim 8, wherein the plurality of transmission bands include five contiguous or discontiguous transmission bands.

\* \* \* \* \*